Figure 1:
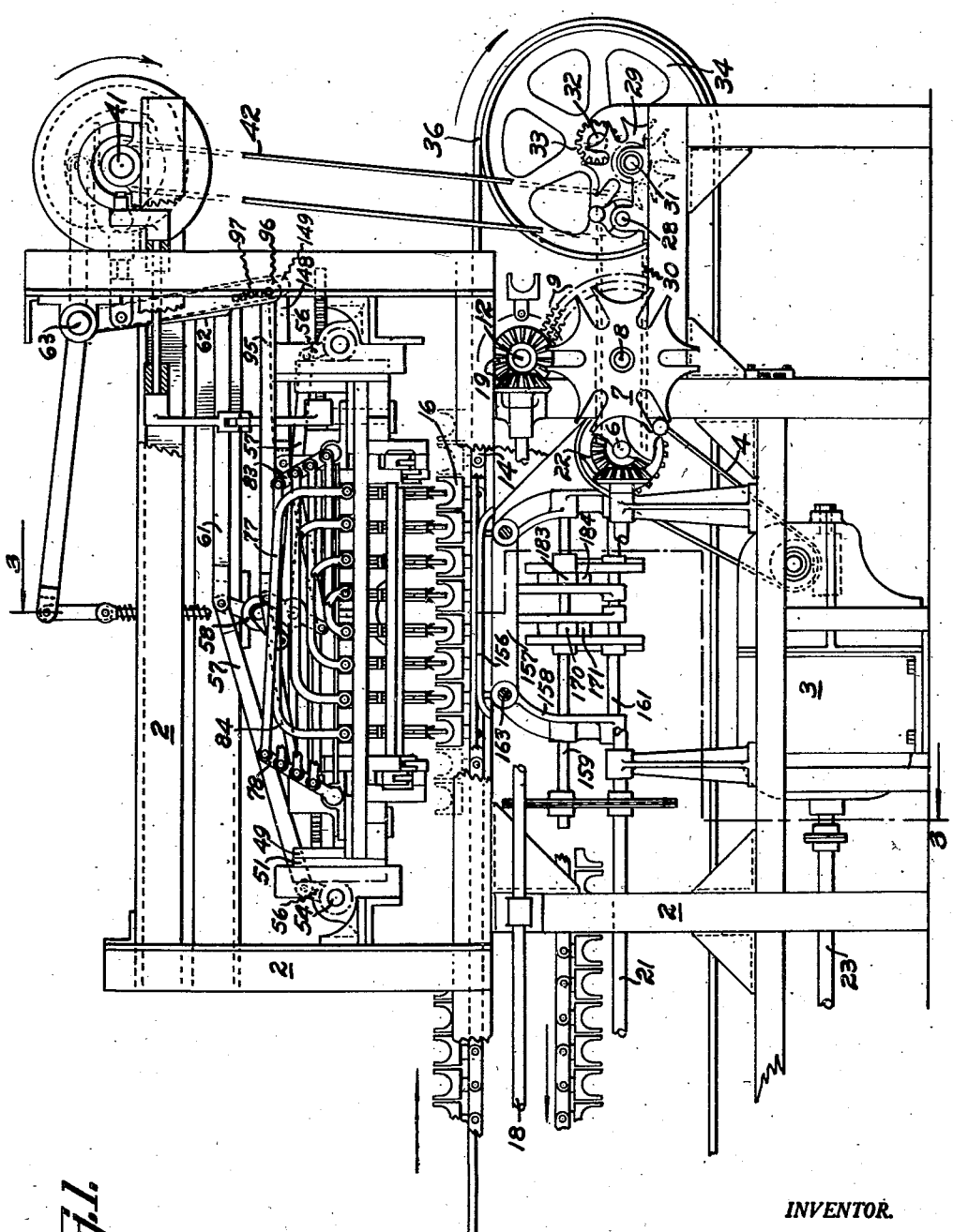

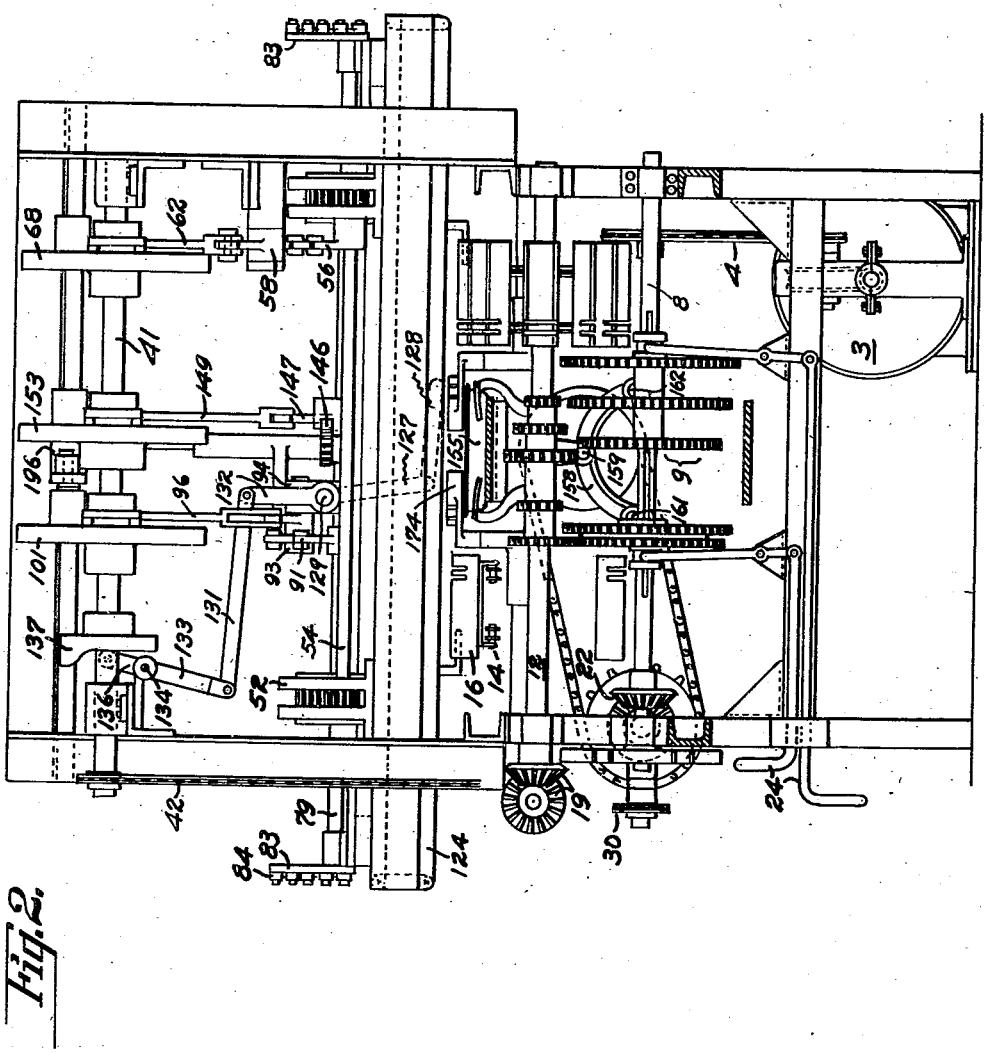

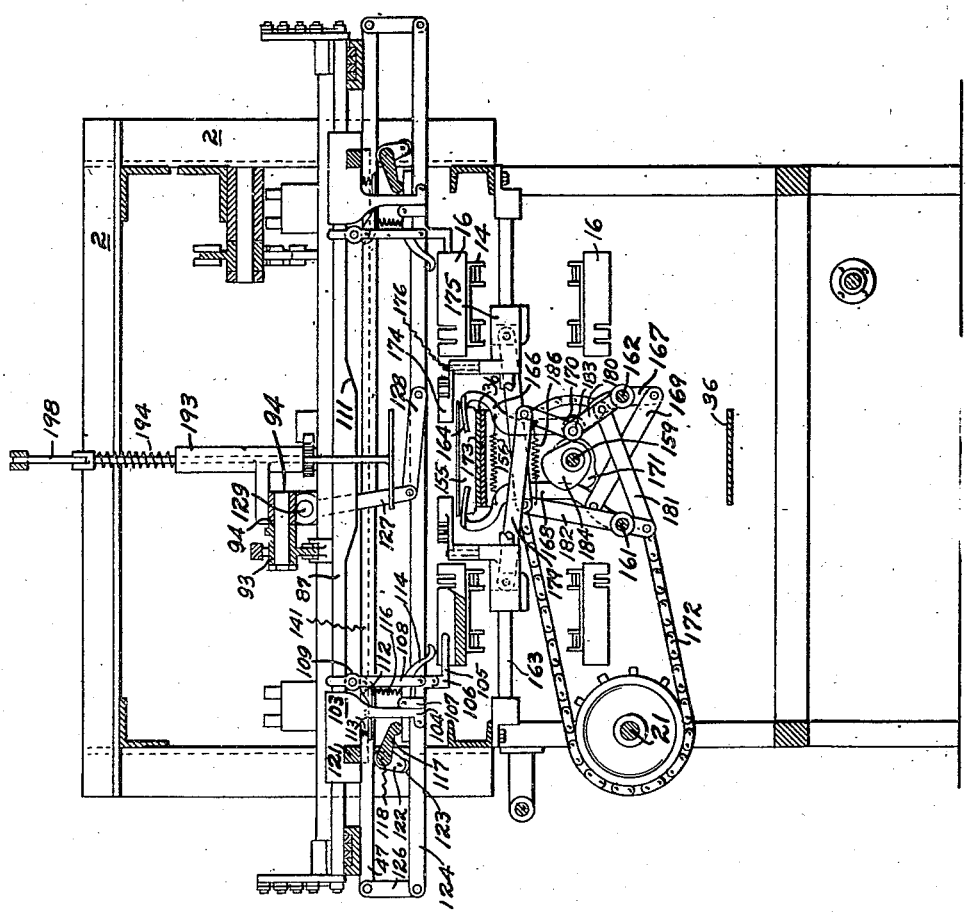

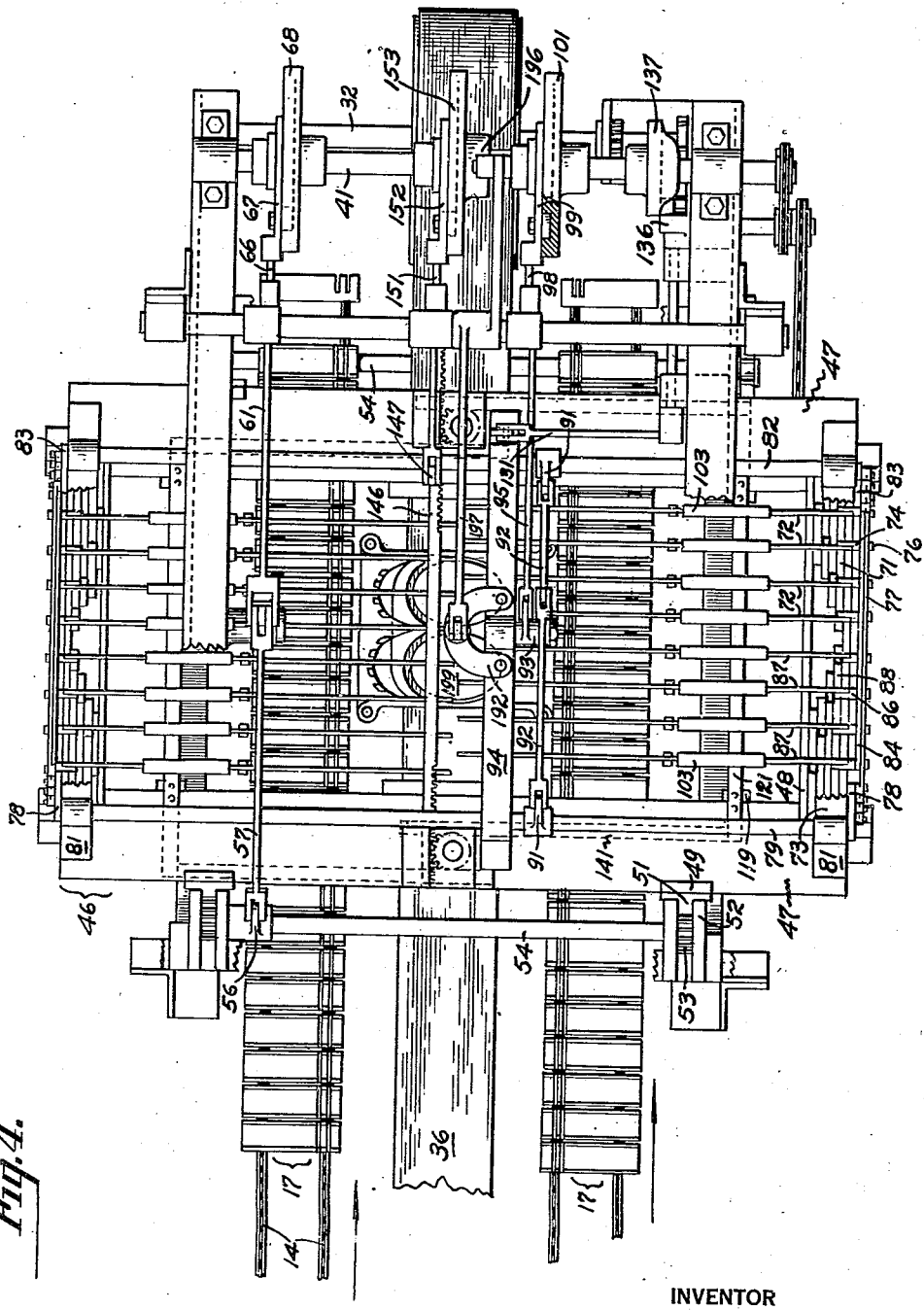

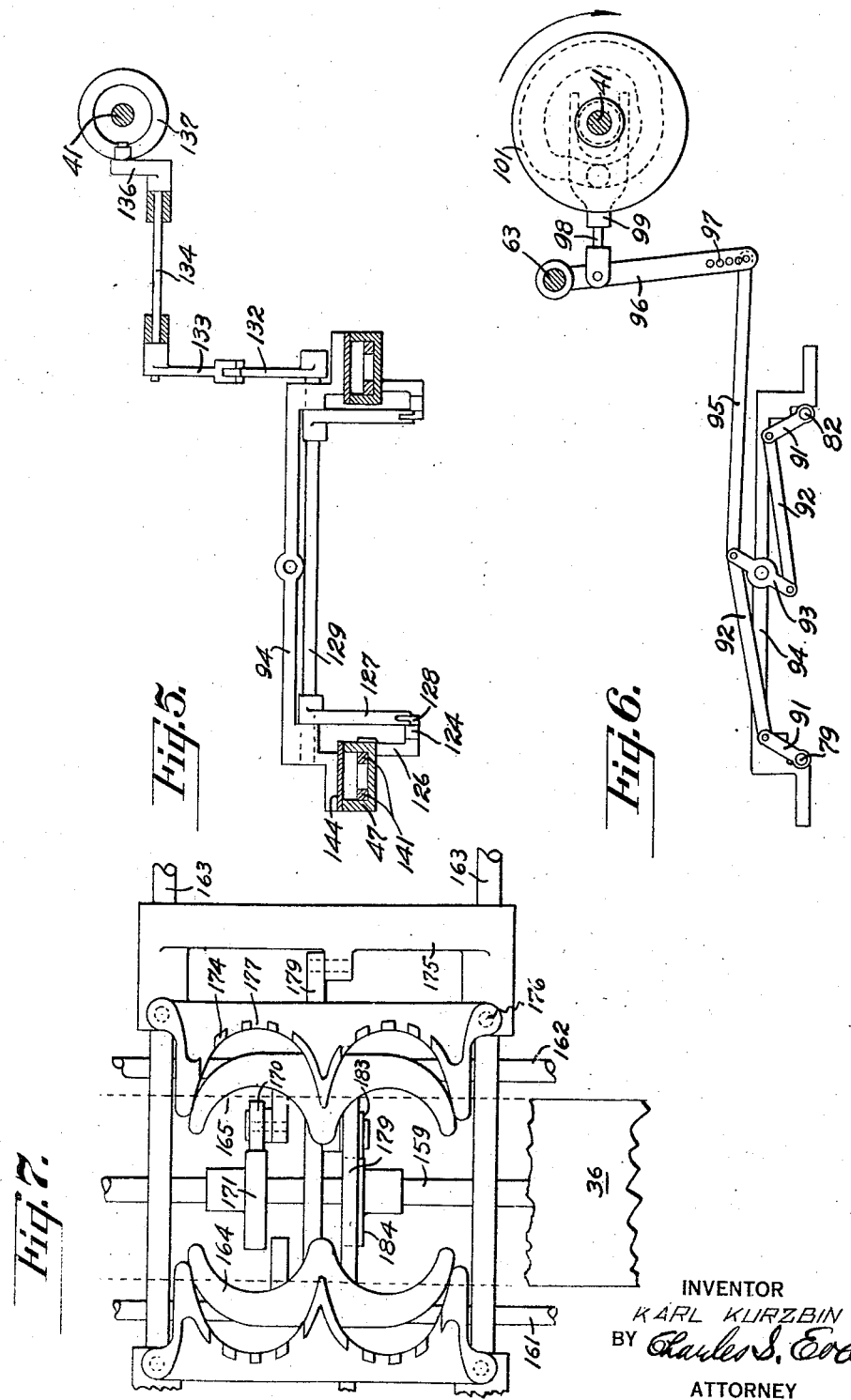

Aug. 14, 1945.    K. KURZBIN    2,382,729
FISH PACKING MACHINE
Filed Aug. 9, 1943    6 Sheets-Sheet 6

INVENTOR
KARL KURZBIN
BY Charles S. Evans
ATTORNEY

Patented Aug. 14, 1945

2,382,729

UNITED STATES PATENT OFFICE 2,382,729

FISH PACKING MACHINE

Karl Kurzbin Berkeley, Calif.

Application August 9, 1943, Serial No. 497,928

13 Claims. (Cl. 226—14)

My invention relates to machines for packing fish in cans; and the broad object of the invention is the provision of mechanism for lifting a plurality of dressed fish from a conveyor and placing them in a can, so that the can may next be carried to the precooker and seamer and then processed.

More specific objects include the provision of improved means for picking up the fish from the feed conveyor, improved means for condensing the pack of picked up fish over the canning station, improved means for shaping the assembly of fish into a pack having the form of the can, improved means for inserting the fish pack into the can, and improved means for changing the machine so as to pack a varying number of fish in a can.

Other objects of the invention together with the foregoing will be made clear in the following description of my invention and the preferred embodiment of means for practicing the same, which is illustrated in the drawings accompanying and forming part of this specification. I do not limit myself to the showing made by the description and drawings, as I may adopt variations of the preferred form within the scope of the appended claims.

Referring to the drawings from which portions and parts of the machine are omitted in order to simplify the views:

Figure 1 is a side elevation of my packing machine. Figure 2 is an end elevation, the direction of the view being from the right of Figure 1. Figure 3 is a vertical sectional view, the plane of section being indicated by the line 3—3 of Figure 1. Figure 4 is a plan view of the machine. Figures 5, 6, 7, 8 and 9 are detail views of units of mechanism. Figures 10 and 11 are diagrammatic views illustrating the packing of five fish to a can.

In terms of broad inclusion, my fish packing machine comprises a frame for supporting various cooperating units of mechanism, including a pair of conveyors for feeding into the machine on both sides in a step-by-step movement a succession of fish bodies from which the heads and entrails have been removed and which have been thoroughly cleaned and made ready for the final steps of canning and processing. A conveyor is also provided for feeding empty cans into the machine and to the packing station in a step-by-step movement timed with the movement of the fish conveyors; and automatically operated means is provided for picking up from one of the side conveyors a number of fish constituting part of the pack to be put in one can, and simultaneously from the other side conveyor, a number of fish constituting the remaining part of the pack, and for bringing these two groups of fish, constituting the whole pack or load for a can, toward each other until the bodies are intermeshed at the packing station, with the tail ends sloping down sharply; and then moving the fish laterally into close proximity and lowering them until the tail-ends rest on the can bottom. Then as the supporting devices are withdrawn from the fish to return to first position, automatically operating means subject the combined groups of fish to a pack-shaping pressure to mold them to the exact shape of the underlying can, and push the shaped first pack down and completely into the can.

Any practical number of such units may be combined in one machine, and I have chosen for this description and illustration a machine in which two cans are packed simultaneously with eight fish each, four fish being taken from each side for each can. The same machine is readily changed to pack four, five, six and seven fish in a can.

In greater detail and with reference first to Figure 1, my packing machine comprises a frame 2 for the most part conveniently made of angle iron bolted or welded together, and in the lower part of which an electric motor 3 is arranged for driving the mechanism. The motor is of the geared type and is connected by chain 4 running over suitable sprockets with the shaft 6. The motor speed and the several ratios are such as to turn the shaft 6 about 25 to 30 R. P. M. Power to drive the various mechanism is taken from this shaft.

Driven from the shaft 6 through a 1:6 Geneva gear 7 is the shaft 8, connected by a series of speed change gears, collectively indicated by the reference numeral 9, Figure 2, with the shaft 12, which carries the sprockets over which run the conveyor chains 14, mounting the fish-carrying pocket blocks 16. As best shown in Figures 2 and 4, a conveyor of this sort collectively designated with the reference numeral 17, is arranged on each side of the machine, bringing the headless, eviscerated and cleaned fish in from the left as viewed in Figures 1 and 4. Fish may be prepared by hand and placed in the pocket blocks of the conveyors with the tail ends pointing in, but it is contemplated that my packing machine will be placed in series with dressing apparatus for preparing the fish; and in this case the conveyors extend through the entire series of machines from the loading station where the whole fish are placed in the pocked blocks, through the head and tail cutting station, eviscerating and cleaning stations and into the packing machine constituting the present invention.

For these reasons it is desirable to drive all of the machines from one motor; and therefore a shaft 18, driven by gears 19 from shaft 12, and a shaft 21 driven by gears 22 from shaft 6 are extended backwardly (to the left of Figure 1) and connected to drive mechanism of the dressing apparatus. The shaft of the motor 3 is also extended back in the shaft 23 and connected to drive fast moving parts.

Five changes of speed are provided by the gears 9; and selection is made by means of the handles 24 to vary the number of fish from four to eight which are presented at the packing station by each of the side conveyors 17 with each forward step.

Journaled on the frame is a short shaft 28 on which is mounted the driving stud for the 1:6 Geneva gear 29. The shaft 28 is driven from shaft 6 by chain 30 running over suitable sprockets. Geneva gear 29 is fixed on shaft 31, which drives shaft 32 through the gears 33. Shaft 32 carries pulleys 34 over which passes the conveyor belt 36 which carries empty cans up the mid portion of the machine to the packing station, and then carries the packed cans forward and out of the machine to a disk or other suitable conveying means, not here shown which advances them another step in the procedure ending with the final cooking.

The shaft 28 also drives shaft 41 by a chain 42, running over suitable sprockets; and this shaft 41 operates all of the various mechanisms which cooperate to pick up the fish from the pocket blocks on the fish conveyors and place them in an orderly pack within the can.

Since a plurality of fish are packed in each can, the units of like mechanism are of course multiplied, and before describing the mechanism it will be helpful to follow the handling of the fish constituting the pack for one can from the conveyor pocket blocks which have carried them to the packing station and there paused in their step-by-step movement. As the pocket blocks come to rest, a straight metal finger moves axially into the open end of each fish; and at the end of this movement, a clamping finger drops upon each fish to seize it. Each pair of clamping fingers holding the fish as between thumb and forefinger, then rises and moves toward the center of the machine. A similar action has taken place on the opposite side of the machine. In the present case, four fish are lifted from each side; and as these two groups of fish approach each other their tail ends intermesh, the fish bodies sloping sharply down. At this point the holding fingers move laterally to bring all eight of the fish close together over the can lying directly below. The holding fingers now drop to lower the fish partly into the can. Pack shaping arms forming a ring then compact the fish, the fingers release their holds and are withdrawn leaving the fish partially in the can and partially within the pack-shaping ring, from which they are pushed down into the can an instant before the next forward step of the can conveyor carries the filled can forward and an empty one into position for the next packing cycle.

The mechanism for handling the fish as just described is arranged on an elevator frame collectively designated by the reference number 46. It is seen in plan in Figure 4; and means are provided for raising and lowering the elevator frame so that the fish-holding fingers are raised and lowered as required in time with the operation of the conveyors and other mechanisms. The elevator frame is substantially rectangular in shape, and comprises two opposite and parallel sides 47 extending across the machine, and connected at their ends with the opposite and parallel ends 48, lying at right angles to the sides. All of these four frame members are essentially hollow or of channel section and each provides a slideway in which operating parts reciprocate.

Formed on the side of each frame side member 47 are two spaced upwardly extending lugs 49, to each of which is fixed a short rack 51, slidable in the guide bracket 52 and in mesh with a pinion 53 lying within the bracket and fixed on the shaft 54, journaled in the two brackets on one side. The opposite side of the elevator frame is similarly provided with racks engaging pinions fixed on a shaft. An arm 56 fixed on each shaft is connected by links 57 with the arms of the rocker 58, journaled on the main frame 2 above the central long axis of the elevator frame; and a link 61 connects the rocker to the end of lever 62 pivoted on the fixed shaft 63 suitably held in brackets on the main frame 2. Pivoted to the lever is the shank 66 of the cam rider 67 reciprocated in a planned movement by the cam 68 fixed on the shaft 41. It will be clear from the above that with rotation of the shaft 41 and cam 68, a timed movement is transmitted to the rocker 58, and thence to the shafts 54, and that like oscillation of the shafts and pinions 53 raises and lowers the elevator frame while maintaining its parallelism.

Means are provided on the elevator frame for picking up from the pocket blocks on each side of the machine the two groups of fish which together with the two groups from the opposite side constitute the packs for two cans, moving the fish lengthwise toward the center of the machine, and then sideways to divide them into two closely laid packs; and finally depositing each pack in the underlying can. Slidable in the channel of each frame member 48 at the right end thereof, as best shown in Figure 4, are four slide bars 71 to the top edge of each of which and at right angles thereto is fixed a track bar 72 extending to the center of the machine, and overlying the center of a pocket block on the fish conveyor below during its pause. A retainer plate 73 overlying the track bar keeps the slide bars in their channel while permitting sliding thereof, each with its attached track bar.

The outer end of each track bar is provided with a head 74 adapting it to be connected by a pivot pin 76 to a bent link 77 which is pivoted at its other end to a lever arm 78, (left side of Figures 1 and 4). This lever arm is fixed to the end of a shaft 79 extending across the machine and carrying on its other end a similar lever arm connected by similar links to the track bars on that side. The shaft 79 is journaled in bearings 81 at each end. A similar shaft 82 and lever arms 83 are arranged on the opposite side of the elevator frame (right side of Figures 1 and 4); and are pivotally connected by links 84 with heads 86 on track bars 87 fixed on slide bars 88. Thus there are four sets of four track bars each, the two sets of track bars 72 (four on each side of the machine) connected to shaft 79; and the two sets of track bars 87 connected to shaft 82.

On each shaft 79 and 82 is fixed an arm 91, pivotally connected by link 92 with the rocker 93 journaled on the bridge bar 94, supported at its two ends on the opposite sides 47 of the elevator frame. The rocker is actuated by the link 95 pivoted at one end to the rocker, and at the other to a lever arm 96 pivotally mounted on the fixed shaft 63. The point of pivotal connection between link 95 and lever arm 96 is made adjustable by providing a series of holes 97 in a selected one of which the pivot lies. This is done to vary the effective throw of the lever arm, and hence of the rocker 93, so that the movement of the track bars 72 and 87 may be varied when the machine is organized for packing less than full capacity. The lever arm 96 is oscillated by the shank 98 of the cam rider 99 actuated in a planned motion by the cam 101 fixed on the shaft 41. It will be clear from the above that with one full rotation of the cam 101, the track bars 72 are all moved into a close group of four on each side of the machine, and then returned to first or open position in alignment with the underlying pocket blocks, it being noted that both pocket blocks and track bars on one side of the machine are staggered with respect to those on the opposite side. Simultaneously, the track bars 87 are similarly moved into a close group of four on each side of the machine, and then returned to open position.

A carrier including pick-up mechanism is slidably mounted on each track bar and all eight of the carriers and pick-up mechanisms on each side are actuated and controlled by the same means, such means on the two sides being operated simultaneously.

Slidable on each track bar is a carrier 103, conveniently formed of two spaced plates connected at their top edges and within which the track bar lies. The plates extend downwardly in spaced pendent legs forming a bracket 104 in which a fish-engaging finger 105 is pivoted. The finger is preferably of the shape shown in Figure 3, and in the position shown, in which it has just entered a fish, has upper and lower portions which are parallel, and connected by a vertical portion in which there is a stiff knuckle joint 106. The pivot of the joint slants somewhat with respect to the sides of the vertical portion so that when the lower portion of the finger is swung upwardly it passes to the side of overlying parts without interference. The lower part of selected fingers are turned up about the knuckle joint to prevent the fingers so turned up from picking up a fish, when the machine is organized for packing less than its full capacity of eight in one can. The finger has a lug 107 fixed thereon to seat against the bracket so as to limit the upward pivotal swing of the finger assembly while permitting it to swing downwardly. The finger is moved downwardly by the vertical push rod 108 on the upper part of which is a roller 109 bearing against the under face of the associated track bar constituting a cam 111. As shown in Figure 3, this cam is shaped to throw the push rod and finger downwardly as the carrier assembly approaches the center of the machine. In order to keep the push rod in upright position and in substantial parallelism at all times, the rod is also pivotally connected to a lever 112 pivoted on the bracket in approximate parallelism to the finger 105. A spring 113 interposed between the lever and the carrier tends to keep the finger and connected parts in the uppermost position, with the roller 109 against the cam 111; and thus it effects the recovery movement of the finger after the fish has been released.

Means are also included in the carrier assembly to clamp down on the fish in which the finger has entered so as to hold it thereon. If the bar 106 be considered a finger, the bar 114 pivoted on the lug 107 may be considered a thumb, since the action of the two is substantially the same with regard to the fish as that of finger and thumb would be if the fish were moved by the hand. A spring 116 interposed between the thumb bar and lever 112 maintains a continual pressure tending to depress the end of the bar, but the position of the bar is controlled by the round nose plate 117 which extends across the rear portions of all the thumb bars and is pivotally mounted by means of a short shaft 118 projecting from each end of the plate and journaled in a bracket bearing 119 fixed on the underside of the bar 121. Pressure of the plate nose upon the adjacent ends of the thumb bars at the proper time raises the fish-engaging ends to release the fish, while relaxation of such pressure permits the springs 116 to act to engage the thumb bars with the fish. This rocking of the plate 117 is accomplished by fixing to each end of the plate an arm 122 on the free end of which is journaled a roller 123. The roller overlies a bar 124 pivotally supported on links 126, pivoted to the ends of the elevator frame member 47. The bar 124 is swung to the left (of Figure 3), and of course upwardly, because the supporting links are short, by the lever arm 127, connected by link 128 to the bar and fixed on the shaft 129, journaled in the bridge 94. The shaft is rocked by means of a link 131 (Figure 2) pivotally connecting an arm 132 on the shaft to an arm 133 on the shaft 134, journaled in bearings fixed on the main frame members. At its opposite end the shaft 134 is provided with an arm 136 carrying a cam roller which engages the cam face of the cam 137. When the cam operates to turn the shaft 134, the bar 124 on each side is pulled over and upwardly, carrying up the roller shod arms 122 and depressing the nose of the plate 117, thus raising the fish engaging ends of the thumb bars.

Means are provided for moving the carriers toward the center of the machine. On the underside of each carrier in the group on each side of the machine is a square notch fitting over a bar 121. This bar extends across the elevator frame and at each of its ends is fixed to a rack 141 which lies in the channel or slideway of the elevator frame member 47, and is in mesh with a pinion 142 also in the channel. Since there is a bar 121 on each side of the frame, there are two racks 141 in each channel; and these mesh with the pinion on opposite sides as best shown in Figures 8 and 9. Each pinion is fixed on a short shaft 143, journaled in the bottom wall of the frame member and in the cover plate 144, both bottom wall and cover plate being heavily bossed at this point. On the upper end of each shaft is a second pinion 145 and these upper pinions are connected for simultaneous and like movement by a rack bar 146 slidably arranged in slideways formed in the cover plate bosses.

Extending upwardly on the rack bar is a lug 147 connected by link 148 with the lever arm 149 pivoted on the fixed shaft 63. The lever arm is oscillated by the shank 151 of the cam rider 152, actuated in a planned motion by cam 153. Rotation of this cam therefore moves the two bars 121 in a timed movement from the sides of the machine toward the center and back again while maintaining them at all times in parallelism; each bar in such movement carrying with it the associated group of carriers.

Means are provided for compacting into the oval shape of the can, the two groups of interlapping fish, and then pressing the shaped pack down into the can. Means are also provided for positioning a succession of cans under the pack-shaping device and for holding them while the pack is pressed into them.

Since the machine here described acts upon two groups of fish from each side conveyor to form two shaped packs, two cans at a time are presented at the packing station under the pack-shaping means by the conveyor belt 36 timed by its driving means to move in the intervals between the shaping of the packs.

The can conveyor belt enters the machine from the left as viewed in Figure 1; and carries a succession of flat oval cans 155 which have been placed thereon in approximately accurate position with the long axes lying crosswise of the belt. Support is provided for the upper reach of the belt at the packing station by a platen 156, Figure 1, carried on a frame 157, having inverted Y-shape arms 158 which provide bearings for the cam shaft 159 which operates the can positioning and pack-shaping devices. These arms also provide a mounting for fixed shafts 161 and 162 on which the operating levers for such devices are pivoted. The platen frame 157 is supported on two fixed shafts 163 extending across the main frame of the machine.

As the can conveyor pauses with the two cans below the pack-shaping means, push plates 164, Figure 7 each having two shallow notches 165 in the edge to engage the ends of two closely spaced cans, move in from each side and push the cans accurately into position and then hold them there. One of the plates is carried on the end of an arm 166, Figure 3, pivoted on the fixed shaft 162 and extended below the shaft in the short lever arm 167. The other plate is carried on the arm 168 pivoted on the shaft 161, and connected to the lever arm 167 for simultaneous and like movement with its twin by a link 169.

Timed movement to withdraw the can positioning and holding means is imparted by a roller 170, journaled on the arm 166 and engaging the face of a cam 171 fixed on the shaft 159 which is rotated by a chain 172 from shaft 21. The can positioning and holding plates are pulled toward each other to engage the cans by the tension spring 173 as permitted by the cam.

Immediately above the positioned cans on each side are the pack-shaping arms 174 arranged on a base frame 175 slidably mounted on the two fixed shafts 163. The frame is provided with vertical studs 176 on which the arms are adjustably and replaceably mounted. The arms 174 comprise a thin wall, a little less in vertical height than the can, and shaped as shown in Figure 7, so that when the two arms on opposite sides of the cans are brought together they enclose two oval spaces corresponding in shape and size to the openings into the two underlying cans. Because the fish-engaging fingers 106 fall close to the top edge of the cans just before they are withdrawn, notches 177 are formed in the arm wall to permit the fingers to be withdrawn without interference. The arms are replaceable with arms having a different number and spacing of notches when the machine is set up for a different number of fish to a can.

The arms are moved toward each other to shape the pack by links 179, one of which is connected to a lever arm 180 pivoted on the shaft 162 and connected by link 181 with the lower end of lever 182, pivoted on the shaft 161 and connected at its upper end with the other link 179. The lever arm 180 has journaled thereon a cam roller 183 riding on the cam 184 fixed on the shaft 159 by the side of cam 172. Rotation of the cam pulls the pack-shaping arms together, against the pull of a tension spring 186, connecting the two lever arms 180 and 182. This spring effects the recovery movement of the arms as soon as the cam permits which is immediately after the fish packs have been pushed into the cans.

After the fish pack has been shaped and the holding fingers withdrawn, the head ends of the fish may not sink fully into the cans. Means are therefore provided to insure the pack fully entering the can. Disposed vertically on one side of the bridge bar 94 and fixed thereon by means of a bracket 192 is a slide bearing 193 in which a rod 194 is reciprocated in a timed movement by a cam 196 conveniently formed on the hub of the cam 153 fixed on shaft 41. The planned motion of the cam is transmitted to the rod 194 by means of a lever 197 pivoted on the shaft 63 and connected to the rod by link 198. The lower end of the rod is provided with a pair of spaced press plates 199, the same shape but a little smaller than the can openings so that when the plates are moved downwardly they press the fish packs out of the packing shaping arms and into the cans. Recovery movement as controlled by the cam is effected by a compression spring 201 interposed between the end of the slide bearing and the rod 194.

As above explained my machine is organized to pack eight fish in each can, but on account of variation in size it is sometimes necessary to reduce this number. By making four simple adjustments my machine may be set up to pack seven, six, five or four fish to a can instead of its full capacity. Thus if five fish are to be packed in a can the conveyor speed is changed by shifting the gears 9 so as to advance the side conveyors to place at the pick-up station with each forward step five fish on each side. Second, the first two fish-holding fingers A and B (referring to Figure 10), and the last finger H on the right side of the machine (as viewed by one standing at the left of the machine as in Figure 1); and the first finger S, and the last two fingers Y and Z on the left side are folded back so as to render the pick-up mechanism at these points inoperative. This is shown in diagram in Figure 10; and the fish to be picked up, and the two packs formed are shown in Figure 11. With the remaining operative fingers, five fish are picked up from each side, the two fish from fingers C and D on the right intermeshing with three fish from fingers T, U and V on the left to form the first pack I, Figure 11; and the three fish from the next fingers E, F and G on the right intermeshing with two fish from the next fingers W and X on the left to form the second pack II. The third adjustment to be made is the throw of lever arm 96, by selection of the pivotal point of connection with link 95 in one of the five holes 97. This varies the distance which the track bars 72 and 87 move to bring the intermeshed fish together. For example, in a pack of eight fish, the spacing of the pick-up fingers is about 1" between centers, but for a pack of five, the spacing is about 1 3/16". Fourth, the pack-shaping arms 174 are replaced with arms having an appropriate spacing of the notches 177 since the spacing of the fingers is different for five fish in a pack than for eight.

If seven fish are to be packed in each can, the first pick-up finger A on the right and the last one Z on the left are turned back, so that in each group three fish come in from one side and four from the opposite side to make seven in each group. Suitable shifting of the gears, and changes in pack-shaping arms and in the throw of the lever arm 96 are also made.

Operation

The machine is first organized, or set up for the desired number of fish, four to eight inclusive, in each can. The side conveyors 17 advance in a step-by-step movement to present the fish at the pick-up station. During the brief pause of the conveyors, cam 153, through the racks 141, moves the two bars 121 toward each other. These bars move the carriers 103 toward the center of the machine, the first result of the movement being to insert a finger 105 into each fish. As each finger reaches the end of its fish-entering movement, the associated thumb bar is depressed by the spring 116 to seize the fish. The spring is permitted to act by the release of plate 117 when the bar 124 controlled by cam 137 is swung to lowest position. With the seizing of the fish, cam 68 operates to lift the elevator frame, so that the fish is raised clear of the pocket block. This occurs while the inward movement of the carrier continues. As the carriers approach the end of their movement the tail ends of the fish in the two approaching groups intermesh since the track bars on opposite sides of the machine are staggered. The track bars 72 and 87 actuated by the cam 101 now start to close up to place the fish in each group close together. At the same time the rollers 109 ride down on the cam faces 111 (of the bars 72 and 87), allowing the holding fingers to slope downwardly. At this point the elevator frame falls so that the intermeshed downwardly sloping tail ends of the two fish packs rest on the bottoms of the cans, which have meanwhile been placed in position and held by the can conveyor belt and the spring pressed plates 164.

The bar 124 now swings up to depress the plate 117 to lift the thumb bars 114 to release the fish; and the carriers start the recovery movement as the pack-shaping arms actuated by the cam 184 close in to condense the packs to fit the cans. The press plates 199 actuated by cam 196, now descend to press the shaped packs into the cans; and as they recover, the pack-shaping arms and can holding plates are withdrawn, and the can conveyor moves forward one step to carry the filled cans toward the discharge end of the conveyor, and replace them with empty ones. In the meantime all parts have returned to first position for a repetition of the cycle.

This application is an improvement of my co-pending application Serial Number 271,286, filed May 2, 1939, now Patent Number 2,326,146, dated August 10, 1943.

I claim:

1. A fish packing machine comprising a main frame, a pair of spaced fish conveyors arranged in the frame, a can conveyor between the fish conveyors, carriers arranged in the frame to move from each fish conveyor to the can conveyor, clamp mechanism on each carrier, and means for actuating the conveyors and carriers and clamp mechanisms in timed movements to pick up fish from the fish conveyor and release them over the can conveyor.

2. A fish packing machine comprising a main frame, a pair of spaced fish conveyors arranged in the frame, a can conveyor between the fish conveyors, carriers arranged in the frame to move from each fish conveyor to the can conveyor, clamp mechanism on each carrier, means for actuating the conveyors and carriers and clamp mechanisms in timed movements, to pick up fish from the fish conveyor and release them over the can conveyor, and means for rendering the clamp mechanisms on selected carriers inoperative to vary the number of fish picked up.

3. A fish packing machine comprising a main frame, a pair of spaced fish conveyors arranged in the frame, a can conveyor between the fish conveyors, carriers arranged in the frame to move from each fish conveyor to the can conveyor, clamp mechanism on each carrier, means for actuating the conveyors and carriers and clamp mechanisms in timed movements to pick up fish from the fish conveyor and release them over the can conveyor, and means acting in time with the carriers for shaping the group of fish presented by the carriers at the can conveyor before their release of the fish.

4. A fish packing machine comprising a main frame, a pair of spaced fish conveyors arranged in the frame, a can conveyor between the fish conveyors, an elevator frame vertically movable in the main frame, carriers arranged in the elevator frame to move from a pick-up station at each fish conveyor to a packing station at the can conveyor, clamp mechanism on each carrier, and means for actuating the conveyors and elevator frame and carriers and clamp mechanisms in timed movements to pick up fish from the pick-up stations and release them at the packing station.

5. A fish packing machine comprising a main frame, a pair of spaced fish conveyors arranged in the frame, a can conveyor between the fish conveyors, an elevator frame vertically movable in the main frame, a plurality of laterally movable track bars extending from each side of the movable frame across the fish conveyor to the can conveyor, a carrier slidably mounted on each track bar, clamp mechanism on each carrier, means for driving the conveyors in a timed step-by-step movement to position fish at a pick-up station and cans at a packing station, means timed with movement of the conveyors for actuating the elevator frame and carriers and clamp mechanisms to pick up fish from the pick-up station and convey them into a group at the packing station, means timed with movements of the carrier for effecting lateral movement of the track bars to compact the group, and means acting in time with the compacting means for introducing the grouped fish into a can at the packing station.

6. A fish packing machine comprising a main frame, a pair of spaced fish conveyors arranged in the frame, a can conveyor between the fish conveyors, an elevator frame vertically movable in the main frame, a plurality of laterally movable track bars extending from each side of the movable frame across the fish conveyor to the can conveyor, a carrier slidably mounted on each track bar, clamp mechanism on each carrier, means for driving the conveyors in a timed step-by-step movement to position fish at a pick-up station and cans at a packing station, means timed with movement of the conveyors for actuating the elevator frame and carriers and clamp mechanisms to pick up fish from the pick-up station and convey them into a group at the packing station, means timed with movements of the carrier for effecting lateral movement of the track bars to compact the group, means acting in time with the compacting means for introducing the grouped fish into a can at the packing station, and means for varying the degree of lateral movement of the track bars to vary the spacing of the fish in the group at the packing station.

7. In a packing machine, a frame, laterally movable track bars arranged in the frame, a carrier including pick-up mechanism slidable on each track bar, means for moving the carriers simultaneously along the track bars and for operating the pick-up mechanism, and means timed with the movement of the carriers for moving the track bars laterally to alter the spacing thereof.

8. In a packing machine, a frame, laterally movable track bars arranged in the frame, a carrier including pick-up mechnism slidable on each track bar, a cross bar engaging each of the carriers, means for moving the cross bar to move the carriers simultaneously along the track bars and for operating the pick-up mechanism, and means timed with the movement of the carriers for moving the track bars laterally to alter the spacing thereof.

9. In a packing machine, a frame, a plurality of slide bars slidably arranged in the frame, a track bar fixed on each slide bar at substantially a right angle thereto, a carrier including pick-up mechanism slidable on each track bar, a cross bar engaging each of the carriers, means for moving the cross bar to move the carriers simultaneously along the track bars and for operating the pick-up mechanism, and means timed with the movement of the carriers for moving the track bars laterally to alter the spacing thereof.

10. In a packing machine, a frame, laterally movable track bars arranged on each of opposite sides of the frame, a carrier including pick-up mechanism slidable on each track bar, means for simultaneously moving toward each other along their associated track bars the two groups of carriers on each side, and means operating in time with the movements of the carriers for operating the pick-up mechanism.

11. In a packing machine, a frame, laterally movable track bars arranged on each of opposite sides of the frame, a carrier including pick-up mechanism slidable on each track bar, means for simultaneously moving toward each other along their associated track bars the two groups of carriers on each side, means operating in time with the movements of the carriers for operating the pick-up mechanism, and means operating in time with the movement of the carriers for laterally moving the track bars into two spaced groups.

12. In a packing machine, a rectangular frame, laterally movable track bars arranged along each of two opposite sides of the frame, a shaft on each of the other sides of the frame, a lever fixed at each end of each shaft, links pivoted at spaced points on each lever and at their other ends pivoted to a track bar, a carrier including pick-up mechanism slidable on each track bar, means for simultaneously moving toward each other along their associated track bars the groups of carriers on the two sides, means operating in time with the movements of the carriers for operating the pick-up mechanism, and means operating in time with the movement of the carriers for oscillating the shafts to move the track bars on each side laterally into two spaced groups.

13. In a packing machine, a rectangular frame, laterally movable track bars arranged along each of two opposite sides of the frame, a shaft on each of the other sides of the frame, a lever fixed at each end of each shaft, links pivoted at spaced points on each lever and at their other ends pivoted to a track bar, a carrier including pick-up mechanism slidable on each track bar, means for simultaneously moving toward each other along their associated track bars the groups of carriers on the two sides, means operating in time with the movements of the carriers for operating the pick-up mechanism, and means operating in time with the movement of the carriers for oscillating the shafts to move the track bars on each side laterally into two spaced groups, the track bars of each group on one side of the frame being staggered with relation to the track bars of the corresponding group on the other side of the frame.

KARL KURZBIN.